United States Patent [19]

Bowkett

[11] Patent Number: 5,985,203
[45] Date of Patent: Nov. 16, 1999

[54] METHOD FOR SHAPING THERMOPLASTIC TUBES

[75] Inventor: Trevor George Bowkett, Shawbury, United Kingdom

[73] Assignee: McKechnie Plastics Limited, United Kingdom

[21] Appl. No.: 08/895,632

[22] Filed: Jul. 17, 1997

[30] Foreign Application Priority Data

Jul. 20, 1996 [GB] United Kingdom .................. 9615297

[51] Int. Cl.$^6$ ........................... B29C 35/08; B29C 35/16
[52] U.S. Cl. ..................... 264/481; 264/40.6; 264/237; 264/295; 264/322; 264/339; 264/348; 264/492; 425/143; 425/174.4; 425/384; 425/392
[58] Field of Search ................. 264/40.1, 40.6, 264/410, 322, 295, 339, 348, 481, 492, 237; 425/143, 384, 392, 174.4

[56] References Cited

U.S. PATENT DOCUMENTS

| | | | |
|---|---|---|---|
| 3,990,284 | 11/1976 | Barten | 72/9 |
| 4,711,747 | 12/1987 | Halter | 264/40.6 |
| 4,772,438 | 9/1988 | Watanabe et al. | 264/40.6 |
| 5,200,124 | 4/1993 | Bowkett | 264/25 |
| 5,407,613 | 4/1995 | Schulte | 264/25 |

FOREIGN PATENT DOCUMENTS

| | | |
|---|---|---|
| 0486237-B1 | 5/1992 | European Pat. Off. . |
| 61-41524 | 2/1986 | Japan . |

*Primary Examiner*—Jan H. Silbaugh
*Assistant Examiner*—Michael Poe
*Attorney, Agent, or Firm*—Larson & Taylor

[57] ABSTRACT

A method for forming a bend in a tube of thermoplastic material by heating a pre-formed bend to a pre-determined temperature and maintaining the temperature substantially constant by the pulsed emission of infra-red radiation from one or more infra-red sources in response to the surface temperature of the tube detected by a remote temperature sensor.

6 Claims, 2 Drawing Sheets

METHOD FOR SHAPING THERMOPLASTIC TUBES

BACKGROUND OF THE INVENTION

This invention concerns an improved method and apparatus for shaping thermoplastic tubes. As used herein, the term "tube" includes hoses, pipes and similar conduits, whether of single or multi-layer construction.

U.S. Pat. No. 5,200,124 owned by the assignee of this invention discloses a method and apparatus for shaping a thermoplastic tube by contactless heating a pre-formed bend region of the tube with a pulsed emission of infra-red radiation to conform the tube to a required bend configuration followed by cooling to retain the required bend configuration while the tube is supported on a former.

The pulsed emission is effected by switching one or more remote infra-red sources on and off to provide a series of separate pulses of which the duration of each pulse and the interval between successive pulses is timed.

For a given pulse duration and pulse interval, the overall number of pulses to achieve the required heating can be calculated. For example, a heating cycle may consist of 20 pulses of which the duration of each pulse is 1.2 seconds and the interval between successive pulses is 2.0 seconds.

Although the method and apparatus disclosed in U.S. Pat. No. 5,200,124 generally performs satisfactorily, it has been found that such time based control of the heating cycle can cause problems if substantial differences in ambient temperature occur requiring "running changes" to be made to the number of pulses.

SUMMARY OF THE INVENTION

It is an object the present invention to provide an improved method and apparatus for shaping thermoplastic tubes to remedy this drawback. It solves the problem of time based control of the pulsed emission of infra-red radiation disclosed in U.S. Pat. No. 5,200,124 by employing a temperature based control of the pulsed emissions which compensates for changes in the ambient temperature.

More particularly, the invention provides a method of forming a bend in a tube of thermoplastic material by contactless heating of a pre-formed bend region of the tube with a pulsed emission of infra-red radiation to conform the tube to a required bend configuration followed by cooling to retain the required bend configuration while the tube is supported on a former characterized in that the pulsed emission of infra-red radiation is controlled in response to the temperature of the tube for heating the tube to a pre-determined temperature and maintaining the pre-determined temperature substantially constant for conforming the tube to the required bend configuration.

Preferably, the tube is heated to the pre-determined temperature by a single pulse of infra-red radiation with one or more subsequent pulses, typically of shorter duration, being used to maintain the pre-determined temperature substantially constant.

Advantageously, the pulsed emission of infra-red radiation is responsive to the surface temperature of the tube. The pulsed emission of infra-red radiation may be responsive to the surface temperature of the tube at one position. Alternatively, the pulsed emission of infra-red radiation may be responsive to the average surface temperature of the tube at a plurality of positions, preferably spaced apart circumferentially.

The invention also provides an apparatus for forming a bend in a tube of thermoplastic material by contactless heating of a pre-formed bend region of the tube with a pulsed emission of infra-red radiation to conform the tube to a required bend configuration followed by cooling to retain the required bend configuration while the tube is supported on a former characterized in that means is provided for controlling the pulsed emission of infra-red radiation in response to the temperature of the tube for heating the tube to a pre-determined temperature and for maintaining the pre-determined temperature substantially constant for conforming the tube to the required bend configuration.

Preferably, the control means includes a remote sensor for producing an output representative of the temperature of the tube and a controller responsive to said output for controlling at least one infra-red emitter.

Advantageously, the output is representative of the surface temperature of the tube detected by the sensor at least one position and more preferably is representative of the average surface temperature of the tube detected by the sensor at a plurality of positions, for example spaced apart circumferentially.

The invention will now be described in more detail by way of example only with reference to the accompanying drawings from which the features and attendant advantages of the invention will be readily understood.

DETAILED DESCRIPTION OF THE EXEMPLARY EMBODIMENTS

Referring to the accompanying drawings, a brief description will first be given with reference to FIG. 1 of the method and apparatus for heat forming a thermoplastic tube 1 disclosed in U.S. Pat. No. 5,200,124, the disclosure of which is incorporated herein by reference, followed by a description with reference to FIGS. 2 and 3 of the improvements thereto according to the present invention.

Figure 1:
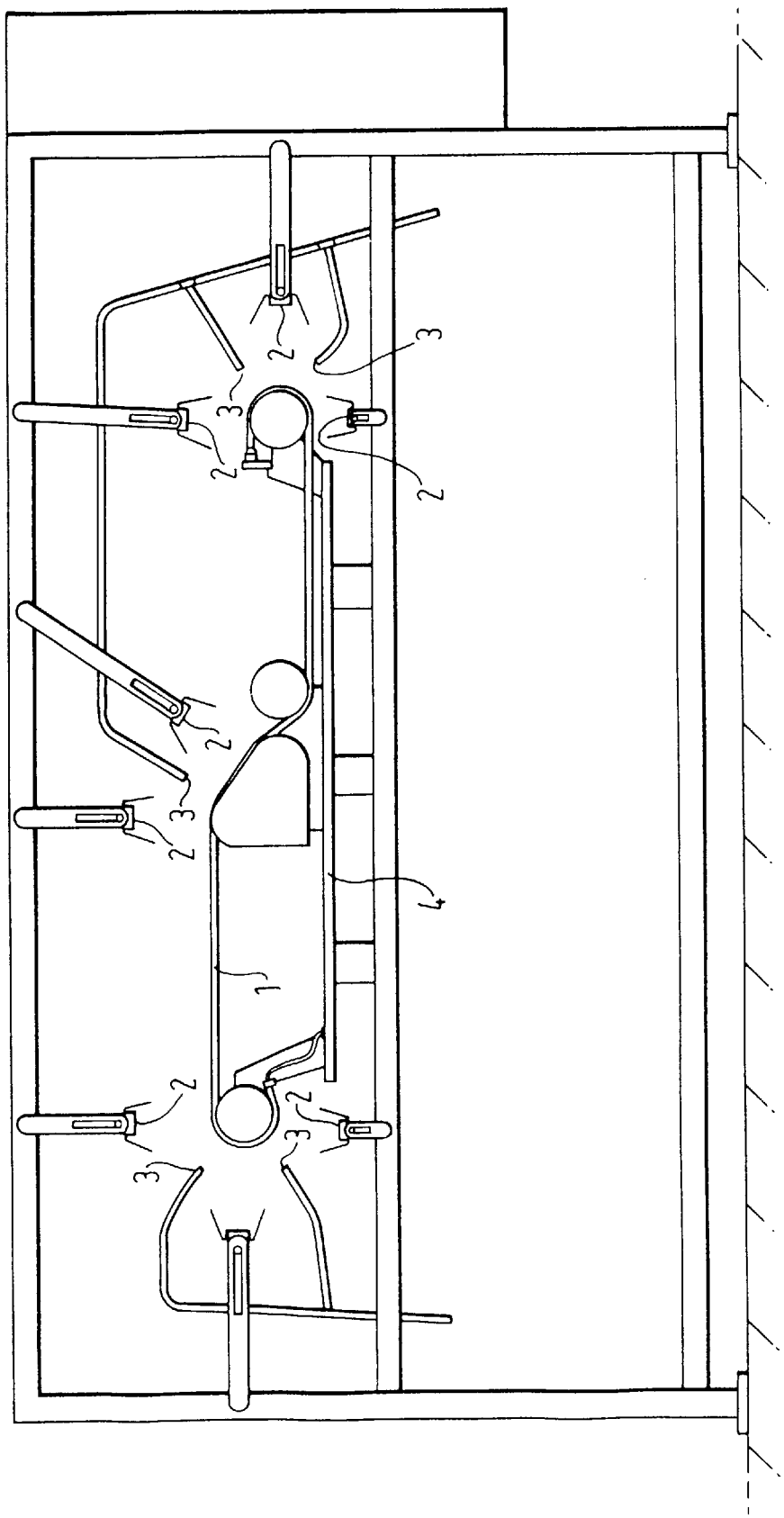
FIG. 1 shows prior art apparatus for heat forming a thermoplastic tube to a required configuration.

The apparatus shown in FIG. 1 comprises a plurality of infra-red emitters 2 such as tungsten halogen lamps having a peak energy emission at short wavelengths for heating the tube 1 to conform the tube 1 to a required configuration and a plurality of outlets 3 for a fluid such as blown air for cooling the tube 1 to retain the required configuration.

The emitters 2 and outlets 3 are arranged for localized contactless heating and cooling of pre-formed bend regions of the tube 1 while externally supported and held stationary in the required configuration on a jig 4 comprising a plurality of formers. The number and position of emitters 2 and outlets 3 can be altered to suit the required configuration of the tube 1.

The tube 1 is heated by a pulsed or intermittent emission of infra-red radiation from the emitters 2 which provides a dwell time between successive pulses or bursts of infra-red radiation allowing thermal conduction through the mass of the tube 1.

In this way, the thermoplastic material is uniformly heated around the circumference of the tube 1 to soften the thermoplastic material for conforming to the required configuration without causing the tube wall to collapse.

The pulsed or intermittent emission of infra-red radiation is controlled for time based operation of the emitters 2 to set the number and duration of each pulse or burst of infra-red radiation and the interval between successive pulses or bursts to obtain the desired heating for the wall thickness and thermoplastic material of the tube 1.

The tube 1 is removed from the jig 4 after cooling to set the thermoplastic material for retaining the required configuration.

Figure 2:
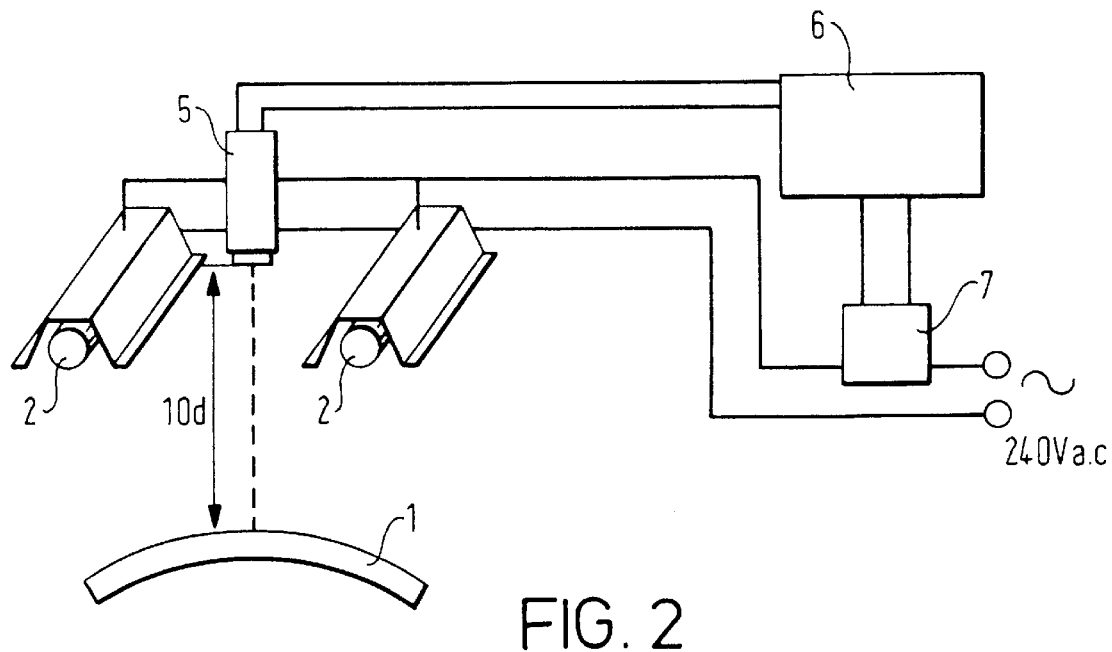
FIG. 2 shows control means for temperature based control operation of the apparatus of FIG. 1 in accordance with the present invention.

Referring now to FIG. 2, control means is shown for temperature based operation of the emitters 2 to provide a pulsed or intermittent emission of infra-red radiation to heat the tube 1 according to the present invention.

The control means includes a temperature sensor 5 for monitoring the surface temperature of the tube 1 and generating an output signal representative of the surface temperature which is fed to a controller 6 for controlling operation of the emitters 2 via an external solid state relay 7. Where the relay 7 controls two or more emitters 2, a heat sink (not shown) may be provided.

In this exemplary embodiment, the temperature sensor 5 is an OS37-10-K non-contact adjustable range infra-red thermocouple having a minimum spot size=13 mm and a field of view =10:1 available from Omega, and the controller 6 is a CN76000 series microprocessor based temperature controller also available from Omega.

The sensor 5 is positioned a distance 10d from the outer surface of the tube 1 where d is the measurement spot diameter and the controller 6 is arranged for operation of the emitters 2 to heat the tube 1 to obtain and maintain a pre-determined surface temperature for a period of time sufficient to conform the tube 1 to the required configuration.

For such temperature based control, the tube 1 is initially heated by a single main pulse or burst of infra-red radiation until the pre-determined surface temperature is detected with subsequent supplementary pulses or bursts of infra-red radiation being used to maintain the pre-determined surface temperature substantially constant.

The controller 6 switches the emitters 2 on and off according to the surface temperature of the tube 1 detected by the sensor 5 so that changes in the ambient temperature are automatically compensated by adjusting the duration of the main pulse or burst to achieve the pre-determined surface temperature.

The emitters 2 may have 4-axis of movement for adjusting the position of the emitters 2 to heat different tube configurations. For example, the apparatus may be adapted to read an identification code such as a bar code corresponding to each tube configuration and to adjust automatically the position of the emitters 2 using electric motors or pneumatics or hydraulics to the correct position for heating the tube 1.

The emitters 2 may be arranged to form more than one bend simultaneously in one stage. Alternatively, the emitters 2 may be arranged to form multiple bends in separate stages with the former jig 4 being indexed or moved by any suitable means such as a conveyor from one stage to the next.

Figure 3:
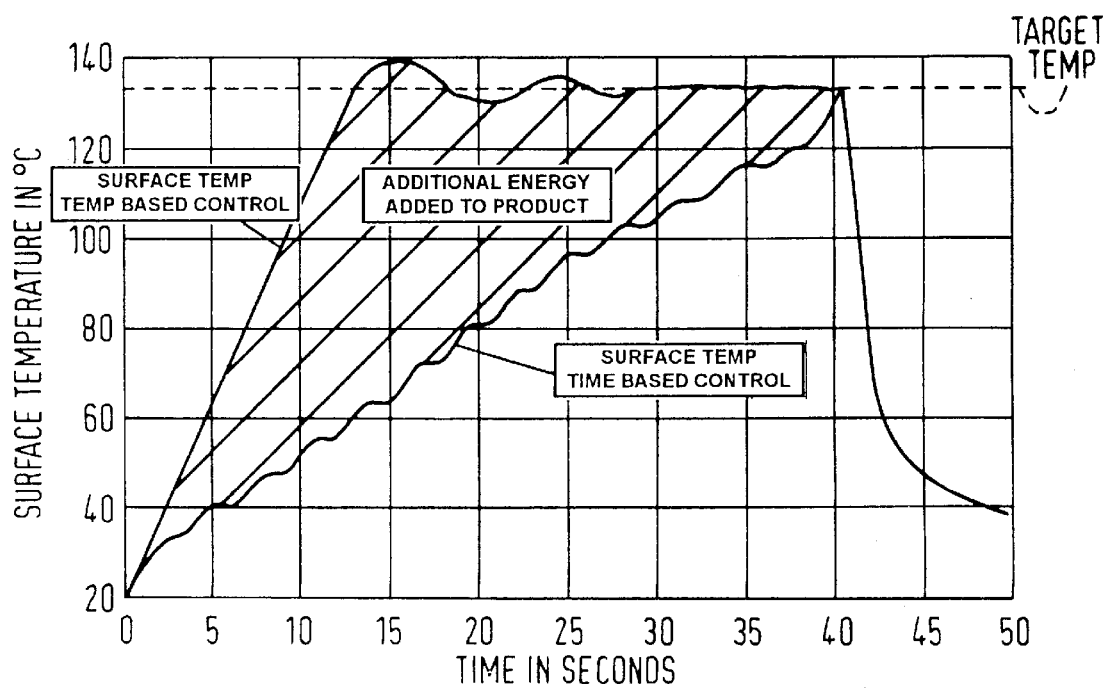
FIG. 3 is a graph comparing temperature and time based control of the apparatus of FIG. 1.

Referring now to FIG. 3, a graph is shown comparing temperature based control of the emitters 2 according to the present invention with time based control of the emitters 2 disclosed in U.S. Pat. No. 5,200,124 to achieve a target surface temperature of approximately 135° C. for conforming the tube 1 to the required configuration.

As can be seen, with the temperature based control of the present invention, the target surface temperature is achieved in approximately 13 seconds by a single main pulse with supplementary pulses of much shorter duration being used to maintain the target surface temperature substantially constant.

In comparison, with the time based control of U.S. Pat. No. 5,200,124, the target surface temperature is achieved in approximately 40 seconds by a plurality of separate pulses each of relatively short duration.

As a result, as shown by the shaded area of the graph, much more energy is added to the thermoplastic material of the tube without increasing the overall heating cycle time with temperature based control of each pulse of infra-red radiation according to the present invention compared to the time based control of each pulse disclosed in U.S. Pat. No. 5,200,124. Alternatively, for certain applications, the overall heating cycle time may be decreased improving efficiency without reducing quality.

Furthermore, by using temperature based control of the pulses, the duration of each pulse and the interval between successive pulses is automatically adapted to the ambient temperature. As a result, problems caused by substantial differences in the ambient temperature are avoided.

In addition, by using shorter pulses after the initial long pulse, the pre-determined target temperature can be more accurately controlled and the soak time for absorbing the energy to uniformly heat the tube is optimized. As a result, quality control of the heating cycle is greatly improved.

The present invention is not limited to the exemplary embodiment above-described and includes modifications to the method and/or apparatus without departing from the general principle of temperature based control of infra-red radiation for conforming a tube of thermoplastic material to a required configuration.

I claim:

1. In a method for forming a bend in a tube of thermoplastic material by contactless heating of a pre-formed bend region of said tube with a pulsed emission of infra-red radiation to conform said tube to a required bend configuration followed by cooling to retain said required bend configuration while said tube is supported and held stationary in the required bend configuration on a former, the improvement comprising:

contactless heating said bend region of said tube to a pre-determined temperature for conforming the tube to the required bend configuration by said pulsed emission of infra-red radiation; sensing the temperature of said bend region of said tube; and adjusting the duration of said pulsed emission of infra-red radiation to automatically compensate for changes in the ambient temperature in response to the sensed temperature to thereby maintain said pre-determined temperature of said bend region of said tube substantially constant while contactless heating said bend region for conforming said tube to said required bend configuration.

2. The method according to claim 1 wherein said tube is heated to said pre-determined temperature by a single pulse of infra-red radiation.

3. The method according to claim 1 wherein said pulsed emission of infra-red radiation is adjusted in response to a surface temperature of said tube.

4. The method according to claim 3 wherein said surface temperature is detected at a plurality of positions and said pulsed emission of infra-red radiation is adjusted in response to an average surface temperature at said plurality of positions.

5. The method according to claim 1 wherein said tube is formed with a plurality of bends.

6. In a method of forming a bend in a tube of thermoplastic material comprising the steps of:

provinding a former and an associated infra-red radiation source spaced from said former, externally supporting the tube on said former prior to heating a region of the tube to pre-form a bend in the region of the tube corresponding to a required bend configuration, holding the tube stationary relative to said former and controlling said pulsed emission of infra-red radiation from said radiation source while heating said region of the tube to pre-form said bend in the said region of the tube to heat the bend and soften the thermoplastic material for confirmation to the required bend configuration, cooling the bend in said region of the tube to set the thermoplastic material for retaining the required bend configuration while holding the tube stationary relative to said former, and removing the tube from said former with the bend formed therein, the improvement comprising:

contactless heating said region of said tube to a pre-determined temperature for conforming the tube to the required bend configuration by said pulsed emission of infra-red radiation;

sensing the temperature of said region of said tube; and adjusting the duration of said pulsed emission of infra-red radiation to automatically compensate for changes in the ambient temperature in response to the sensed temperature to thereby maintain said pre-determined temperature of said region of said tube substantially constant while contactless heating said region for conforming said tube to said required bend configuration.

\* \* \* \* \*